(12) United States Patent
Haselmayr

(10) Patent No.: US 10,940,604 B2
(45) Date of Patent: Mar. 9, 2021

(54) DEVICE FOR DIVIDING MATERIAL PANELS

(71) Applicant: LISEC Austria GmbH, Seitenstetten (AT)

(72) Inventor: Franz Haselmayr, Aschbach (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 16/486,359

(22) PCT Filed: Aug. 9, 2018

(86) PCT No.: PCT/EP2018/071635
§ 371 (c)(1),
(2) Date: Aug. 15, 2019

(87) PCT Pub. No.: WO2019/105604
PCT Pub. Date: Jun. 6, 2019

(65) Prior Publication Data
US 2019/0381686 A1    Dec. 19, 2019

(30) Foreign Application Priority Data

Nov. 30, 2017 (AT) .................................. A257/2017

(51) Int. Cl.
*B26F 3/00* (2006.01)
*C03B 33/02* (2006.01)

(52) U.S. Cl.
CPC .......... *B26F 3/004* (2013.01); *C03B 33/0207* (2013.01)

(58) Field of Classification Search
CPC ............................. B26F 3/004; C03B 33/0207
See application file for complete search history.

(56) References Cited

U.S. PATENT DOCUMENTS

| | | | |
|---|---|---|---|
| 4,140,038 A | 2/1979 | Higgins | |
| 4,435,902 A * | 3/1984 | Mercer | B23Q 9/0064 299/17 |
| 4,716,686 A * | 1/1988 | Lisec | B24B 7/12 198/339.1 |
| 4,903,559 A * | 2/1990 | Landeck | B23K 9/013 493/232 |

(Continued)

FOREIGN PATENT DOCUMENTS

| | | |
|---|---|---|
| DE | 202004006637 U1 | 7/2004 |
| EP | 0140794 A1 | 5/1985 |

(Continued)

OTHER PUBLICATIONS

International Search Report, dated Nov. 26, 2018, from corresponding PCT application No. PCT/EP2018/071635.

(Continued)

*Primary Examiner* — Omar Flores Sanchez
(74) *Attorney, Agent, or Firm* — Nixon & Vanderhye

(57) ABSTRACT

In a water-jet cutting installation for machining substantially vertical material panels such as glass panes, at least one section of the high-pressure line is guided, by a guide system including at least one guide element, to the rear of the device in order to improve access to the intake and/or discharge region of the machining installation and to increase operator safety.

10 Claims, 3 Drawing Sheets

(56) References Cited

U.S. PATENT DOCUMENTS

Figure 1:
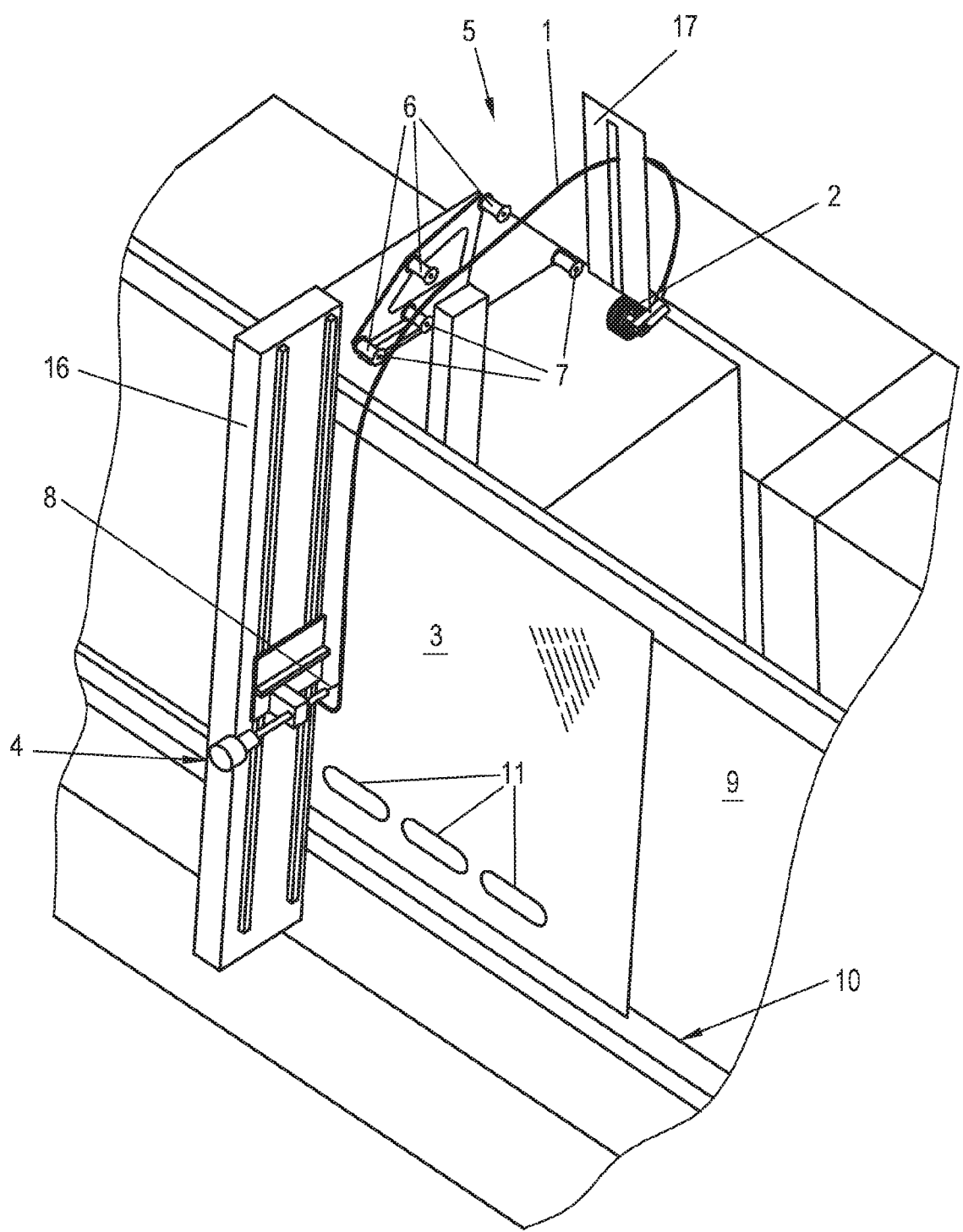

| | | | | |
|---|---|---|---|---|
| 6,125,729 | A * | 10/2000 | Mirabello | B26D 11/00 |
| | | | | 83/177 |
| 9,708,136 | B2 * | 7/2017 | Kudva | B65G 49/063 |
| 10,704,319 | B2 * | 7/2020 | Donohue | E06B 3/673 |
| 2001/0018313 | A1 * | 8/2001 | Lisec | B26F 3/008 |
| | | | | 451/38 |
| 2005/0011229 | A1 * | 1/2005 | Lisec | C03B 33/0207 |
| | | | | 65/182.2 |
| 2005/0126882 | A1 * | 6/2005 | Lisec | B65G 49/062 |
| | | | | 198/345.1 |
| 2013/0025422 | A1 * | 1/2013 | Chillman | B24C 5/00 |
| | | | | 83/53 |
| 2018/0327296 | A1 * | 11/2018 | Cimo | C03C 21/00 |
| 2019/0381686 | A1 * | 12/2019 | Haselmayr | C03B 33/0207 |

FOREIGN PATENT DOCUMENTS

| | | |
|---|---|---|
| EP | 1110686 A2 | 6/2001 |
| EP | 2998088 A1 | 3/2016 |

OTHER PUBLICATIONS

Office Action issued in Chinese Patent Application No. 201880018671.7 dated Sep. 2, 2020 with English abstract provided.

* cited by examiner

DEVICE FOR DIVIDING MATERIAL PANELS

The invention relates to a device for machining material panels, such as, for example, glass panes, with an essentially vertical support system for supporting a material panel and with a nozzle, from which a water jet for cutting the material panel exits, whereby the nozzle can move in a guide system parallel to the plane of the support system and whereby a high-pressure line of the water-jet cutting facility is guided essentially crosswise to the plane of the support system.

Water-jet cutting facilities are known primarily in the area of machining horizontally-oriented material panels. Also, such facilities are known for machining essentially vertically-oriented material panels. The machining principle in this case is very similar: water from a storage device is guided at high pressure to a nozzle via a pump and in most cases is provided with a cutting means. By focusing the high-pressure water jet (in most cases, 4,000 to 6,000 bar), machining cycles can subsequently be performed.

The guiding of high-pressure lines in the case of machines for the machining of horizontally-oriented material panels is implemented essentially via a spiral configuration of the high-pressure line as a stabilizing design. Because of the structural rigidity of the high-pressure line, the additional stabilization by spiral windings, as well as the free space in the +Z-direction (height), these features of the machining devices for the high-pressure line represent an adequate stability.

STATE OF THE ART

Such a device is known from, for example, EP 2 998 088 B1. Described is a workstation for machining panels made of stone, marble, plastic, synthetic material or the like with a work table, two attached sides, a bridge element, a carrier, a motor system, an electrical system for controlling the motor system, a wear-away auxiliary work surface and a workhead, which is carried by a carrier. It is also shown that a high-pressure line is supplied with water via a high-pressure generator (pump). In addition, a coil is provided. The device is limited to the machining of horizontally-oriented material panels. A special guide system for the high-pressure line is not described.

A similar device is shown in EP 0 140 794 B1. In this case, this is a method for producing a laminated glass pane, whereby the polyvinyl butyral film is cut to the desired dimensions by water-jet cutting. In particular, FIG. 1 shows a high-pressure line, which is first formed into a coil and then is guided to the high-pressure water-jet nozzle. When the workhead travels along the X- and Y-axes, the high-pressure line as well as the coil adapt to the new position of the nozzle.

The machine of the WSL type of LISEC Austria GmbH is a water-jet cutting facility for machining essentially vertically-oriented material panels (glass panels). As a problem, it is to be noted that the rigid high-pressure line has to be guided to the machining head in a curve with a large radius. Because of the rigidity that is inherent in a high-pressure line, previously it was possible to implement this guide system only directly in front of the support system, which is arranged so that it lags behind the machine. This has the drawback that access to the facility via the high-pressure line is prevented and already-machined material panels cannot be immediately further processed or transported. Another problem is the space requirement, since the panel-like machined element cannot be removed on the discharge side because of the high-pressure line, and another transport table must therefore be provided.

Another example of such a vertical machining unit is the 6033proHD machine of the Systron GmbH, which also guides the high-pressure line in a curve with a large radius over the support wall that is downstream from the processing machine, in order to be able to compensate for the vertical movement of the cutting head. As an additional drawback in this case, the danger of injury (danger to the operator in the case of an open crack of the high-pressure line) and unpleasant aesthetics in addition to the space problem can be mentioned.

OBJECT OF THE INVENTION

The object of the invention is to eliminate the drawbacks of the state of the art and to provide a device that, in the case of water-jet cutting facilities for the machining of essentially vertically-oriented material panels, guides the high-pressure line so that access to the facility is not prevented and/or blocked.

ACHIEVEMENT OF THE OBJECT

According to the invention, this object is achieved with the features of the main claim.

According to the invention, it is provided in a possible embodiment that the high-pressure line is not guided laterally, as before, but rather backward behind the essentially vertical support wall of the machining facility. An orientation of the support wall of essentially 3 to 6 degrees to the vertical corresponds to the current standard in the case of vertical manufacturing lines in glass processing.

According to the invention, it can be provided in one embodiment that for limiting the maximum and minimum transverse paths of the machining head upward and downward, first and second guide elements of the high-pressure line are provided. This has the advantage that the position of the high-pressure line can be limited upward and that the latter is deflected backward, behind the support wall. In the case of limited hall heights, this can have an advantageous effect.

According to the invention, it can be provided that the guide systems are designed in such a way that the latter guide the high-pressure line as necessary more in height and less to the rear.

According to the invention, the first and second guide systems of the high-pressure line can be implemented by rollers or other guide systems.

According to the invention, it can be provided that the high-pressure line is guided laterally. This can take place, for example, via rods that are secured on the machine frame, whereby these rods limit a sled that is essentially as wide as the outside diameter of the high-pressure line. The high-pressure line according to the invention can be guided through this sled and limited in its lateral movability as necessary. Other lateral guide systems or only one lateral guide system can also be provided.

According to the invention, a pivot point can be provided in the high-pressure line. This pivot point can comprise a coil that is mounted, for example, above a bearing shaft and a guide lever.

According to the invention, it can be provided in an embodiment that during movement of the machining head, the high-pressure line rests in a maximum upper position on the first guide element. In addition, it can be provided according to the invention that during movement of the machining head, the high-pressure line is guided to a maximum lower position on the second guide elements.

According to the invention, it can be provided that the coil, which can be mounted as a pivot point of the high-pressure line, is designed essentially vertically upright. According to the invention, however, it can also be provided that the coil is designed lying horizontally.

In addition, it can be provided according to the invention that one end of the coil is attached; conversely, the other is movable. The movable end thus implements a radial compensation of the movements of the machining head with a recumbent (horizontally-oriented) design. The movable end of the coil when the machining head travels thus executes a pressing and/or pulling movement in the case of upright (vertically-oriented) embodiment.

As "back side," here the entire space is meant, which faces away from the glass pane operating plane. Basically, "back side" relates to the area that is facing away from the plane of the support wall and the glass operating plane.

SHORT DESCRIPTION OF THE DRAWINGS

Figure 2A:
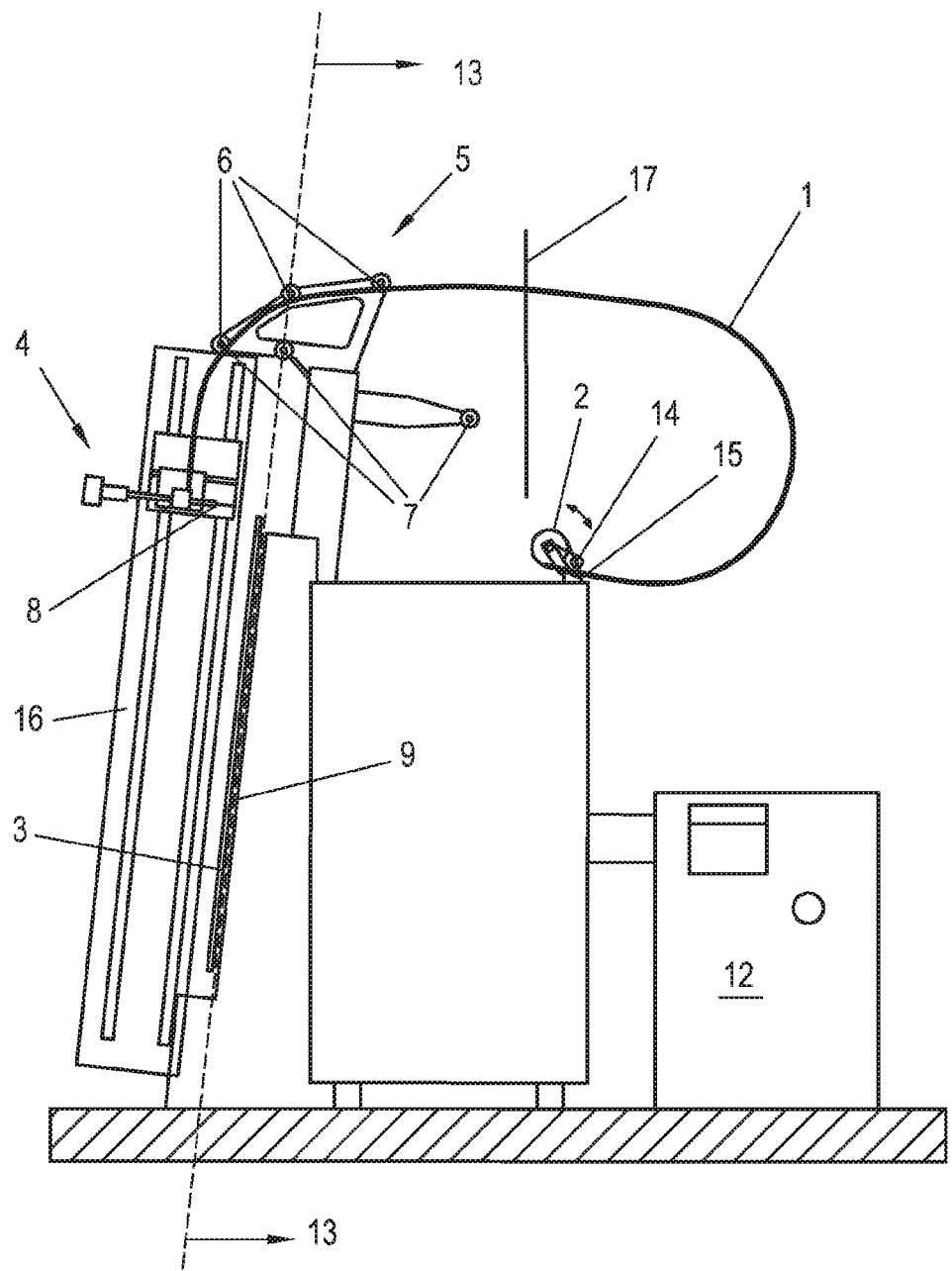
Figure 2B:
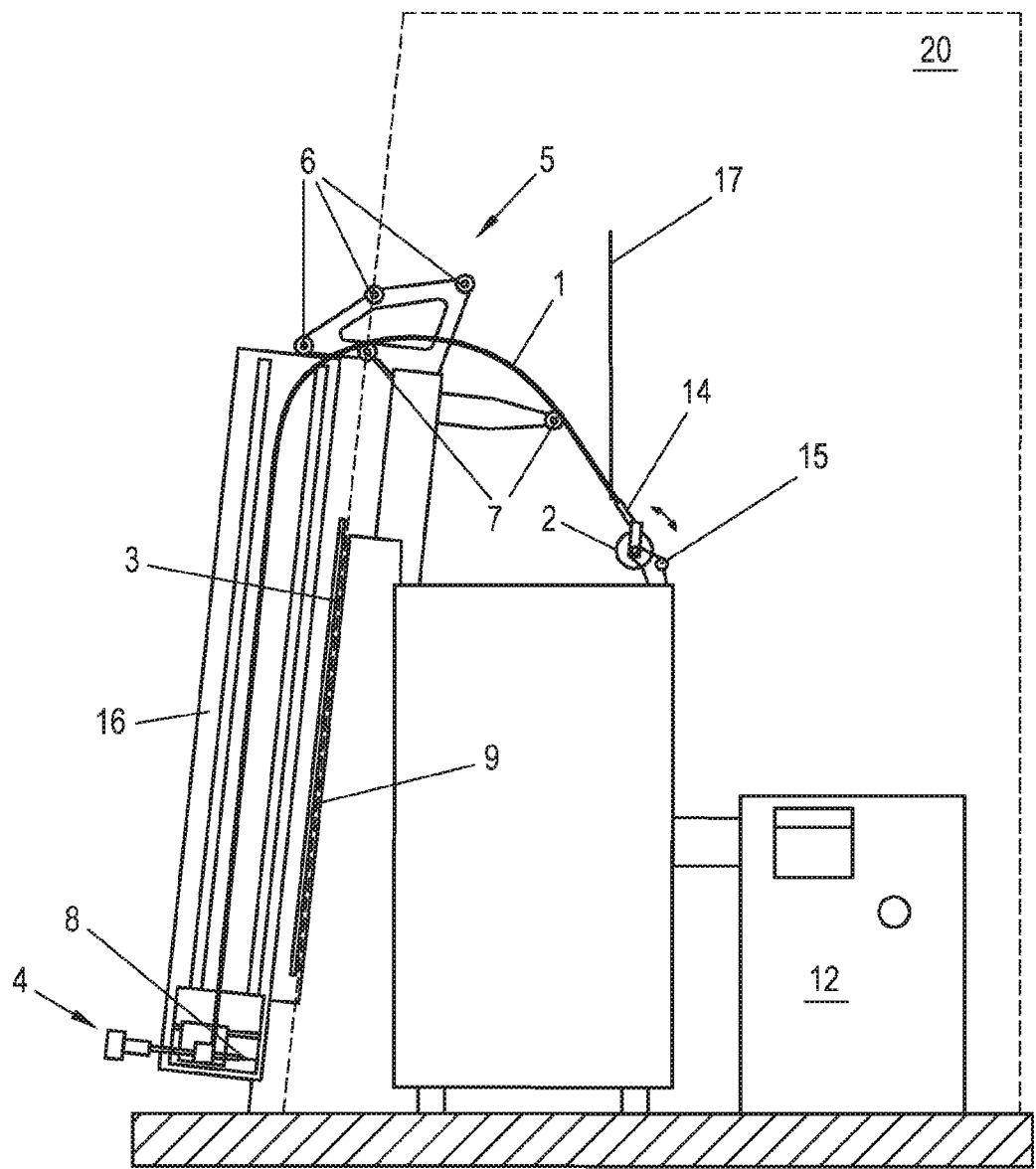

Embodiments of the invention are now described more specifically based on the drawings. Here:

FIG. 1 shows a device according to the invention with an average transverse path of the machining head, FIG. 2a shows the device according to the invention with a machining head that is moved upward, and FIG. 2b shows the device according to the invention with a machining head that is moved downward.

DESCRIPTION OF PREFERRED EMBODIMENTS

Shown in FIG. 1 is a vertical water-jet cutting facility, comprising essentially a high-pressure treatment system 12, a high-pressure line 1, a machining head 4 that can travel along a guide system 16, a water-jet cutting nozzle 8, an essentially vertical support wall 9, a conveying device 10, a holding device 11, a guide system 5 with guide elements 6, 7 for guiding the high-pressure line 1, a coil 2 as well as an attached end 15 of the coil 2, and a movable end 14 of the coil 2.

The support wall 9, which can be, for example, a roller field, a cylinder field, or an air-cushion wall, is essentially oriented vertically and is preferably inclined backward preferably by a few degrees, for example by 3 to 6 degrees, to the vertical, so that a panel-like object 3 (material panel) that is upright on the edge side of a conveying device 10, for example a roller conveyor on the lower edge of the device, preferably a glass pane, is inclined backward and thus abuts the support wall 9.

In front of the support wall 9, a guide system 16, for example a guide rail, is provided, on which a sled with the machining head 4 is guided back and forth in an adjustable manner, which head carries a water-jet cutting nozzle 8.

The holding device 11 can consist of one or more series of suction devices, which can be placed on the panel-like object 3. Another possibility is to hold or to guide a panel-like object 3, for example a glass pane, via water pressure. Moreover, other holding devices 11 from the state of the art are also conceivable. Examples in this respect are beams from which water exits on both sides of the panel-like object 3.

Also, in FIG. 1, a guide system 5 of the high-pressure line 1 is shown. The latter comprises first guide elements 6 for the top-side guiding of the high-pressure line 1 when the machining head 4 is raised (FIG. 2a) and second guide elements 7 for the bottom-side guiding of the high-pressure line 1 when the machining head 4 is lowered (FIG. 2b).

In this embodiment, the first guide elements 6 consist of three rollers that are arranged in succession, while, by contrast, the second guide elements 7 essentially consist of two guide rollers that are separated from one another.

In one embodiment, the first roller of the first guide elements 6 can also represent the first roller of the second guide elements 7. The first roller can serve as an anchor point for deflecting the high-pressure line 1.

More or fewer rollers than depicted are also conceivable. In addition, other types of guide elements are also possible. For example, two opposite spheres that are mounted to roll freely or especially friction-free materials could be provided in the form of "rigid" guide systems. Also, sliding components are conceivable.

Furthermore, an embodiment of a horizontally mounted coil 2 is shown, whereby the latter is mounted in its center axis in this embodiment. One end 14 of the coil 2 is mounted in a stationary manner, while, by contrast, the other end 15 of the coil 2 is freely movable. The freely-movable end 14 makes it possible—via the rotational movement of the coil 2 that is produced by the moving of the machining head 4—to adapt the high-pressure line 1 to correspond to the guide elements 6 and 7.

Orienting the coil 2 vertically or arranging it obliquely would also be conceivable. Furthermore, it would also be conceivable, in addition to the mentioned variants, to mount only one end of the coil 2, to mount the ends of the coil in a stationary manner on both sides, or to mount them in a movable manner on both sides.

In this embodiment, the coil 2 is mounted via a bearing shaft with a guide lever. Other bearings are also conceivable. Furthermore, it would also be conceivable not to mount the coil 2 in its center axis but rather in a position that is removed from the center axis. For example, the coil 2 could also be attached at two or more points of its circumferential high-pressure line 1. Another possible embodiment would be to omit the coil 2. An embodiment would then be to configure the connection of the high-pressure line 1 in such a way that the latter allows the necessary degrees of freedom.

In FIGS. 2a and 2b, a design of a device according to the invention with a machining head 4 that is run upward (FIG. 2a) or downward (FIG. 2b) as far as possible is shown. FIGS. 2a and 2b show how the guide system 5 with the guide elements 6 and 7 interact with the high-pressure line 1 and the coil 2.

FIG. 2a shows how the first guide elements 6 direct the high-pressure line 1 according to the invention to the back side 13 of the support wall 9. A secondary guide system 17, which is formed here by a split panel, ensures that the high-pressure line 1 is limited in its movement in an additional axis (X-axis) or is guided on the secondary guide system 17.

Other secondary guide systems 17 are also possible, for example by one or more rod pairs. These rods can have cross-sections that are equal in value or different in value. In this embodiment, the coil 2 is mounted lying horizontally, whereby one end 15 of the coil 2 is attached and the other end 14 is mounted to move.

Furthermore, FIGS. 2a and 2b depict the high-pressure treatment system 12 for treating a high-pressure water jet.

In FIG. 2a, the "back side" 13 is indicated by arrows. In FIG. 2b, however, "back side" is drawn in as space 20.

In summary, the invention can be described by way of example as follows:

In a water-jet cutting facility for machining essentially vertically-oriented material panels, for example glass panels, at least one section of the high-pressure line 1 is guided by a guide system 5 with at least one guide element 6, 7 to the back side of the device to improve access to the intake and/or discharge area of the machining facility and to increase operator safety.

The invention claimed is:

1. A device for cutting essentially vertically-oriented objects (3), the device comprising:
    a high-pressure treatment system (12);
    a high-pressure line (1) with at least one coil (2) that has a movable end (14) and an attached end (15);
    a guide rail (16);
    a machining head (4) that can move on the guide rail (16);
    a water-jet cutting nozzle (8);
    an essentially vertical support wall (9);
    a conveying device (10); and
    a holding device (11),
    wherein at least one section of the high-pressure line (1) is guided to a back side (13, 20) of the device by a guide system (5) having at least one guide element (6, 7).

2. The device according to claim 1, wherein the guide system (5) comprises first guide elements (6) and second guide elements (7).

3. The device according to claim 1, wherein the movable end (14) of the coil (2) is movable in an essentially radial path.

4. The device according to claim 1, wherein the movable end (14) of the coil (2) is pulled and/or pressed.

5. The device according to claim 1, wherein the coil (2) has two movable ends (14) or two attached ends (15).

6. The device according to claim 1, wherein secondary guide systems (17) are provided.

7. The device according to claim 2, wherein secondary guide systems (17) are provided.

8. The device according to claim 3, wherein secondary guide systems (17) are provided.

9. The device according to claim 4, wherein secondary guide systems (17) are provided.

10. The device according to claim 5, wherein secondary guide systems (17) are provided.

\* \* \* \* \*